United States Patent [19]

Suffi et al.

[11] Patent Number: 4,513,171
[45] Date of Patent: Apr. 23, 1985

[54] AERIAL CABLE TERMINAL

[75] Inventors: Louis Suffi, Westchester; James E. Golden, Evanston; Donald F. Jaycox, Deerfield, all of Ill.

[73] Assignee: Northern Telecom Limited, Montreal, Canada

[21] Appl. No.: 542,298

[22] Filed: Oct. 14, 1983

[51] Int. Cl.³ .................... H01R 9/00; H02G 15/10
[52] U.S. Cl. ................................. 174/41; 174/59
[58] Field of Search ........................ 174/41, 59, 60

[56] References Cited

U.S. PATENT DOCUMENTS 2,859,390  11/1958  Baker ........................ 174/59 X
2,956,106  10/1960  Hasselhorn et al. ............ 174/59
4,414,426  11/1983  Burtelson .................... 174/41 X Primary Examiner—Laramie E. Askin
Attorney, Agent, or Firm—Schwartz, Jeffery, Schwaab, Mack, Blumenthal & Koch

[57] ABSTRACT

An aerial cable terminal has a one piece molded plastic housing with a dividing wall which divides the interior of the housing into front and back compartments. Terminals are mounted in the dividing wall, for example in hollow bosses extending into the front compartment. The conductors of a stub cable extend through the back compartment and are connected to the rear ends of the terminals. Drop wires enter at the bottom into the front compartment and are connected to the front ends of the terminals. A hinged cover closes the front compartment. Potting compound fills the back compartment. Two terminals can be assembled back-to-back, with conductors from one stub cable connected to both sets of terminals. Support hangers are provided on the top of the housing, one set of hangers for a single housing and another set which combines with hangers on the other housing to form combined hangers. Pivotal drop-wire support rings are provided at each end.

20 Claims, 16 Drawing Figures

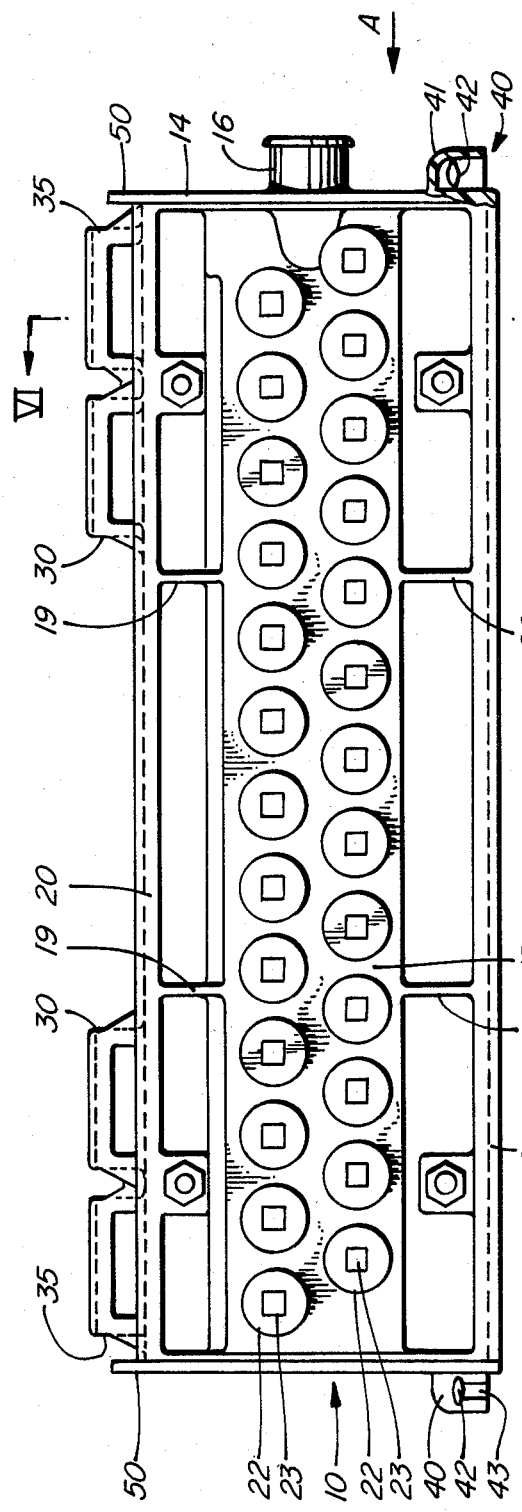
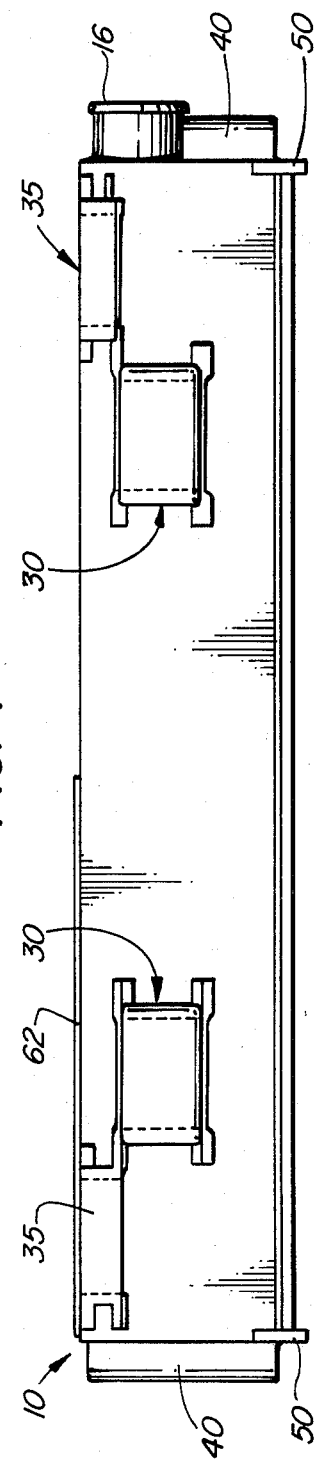
FIG. 1
FIG. 2

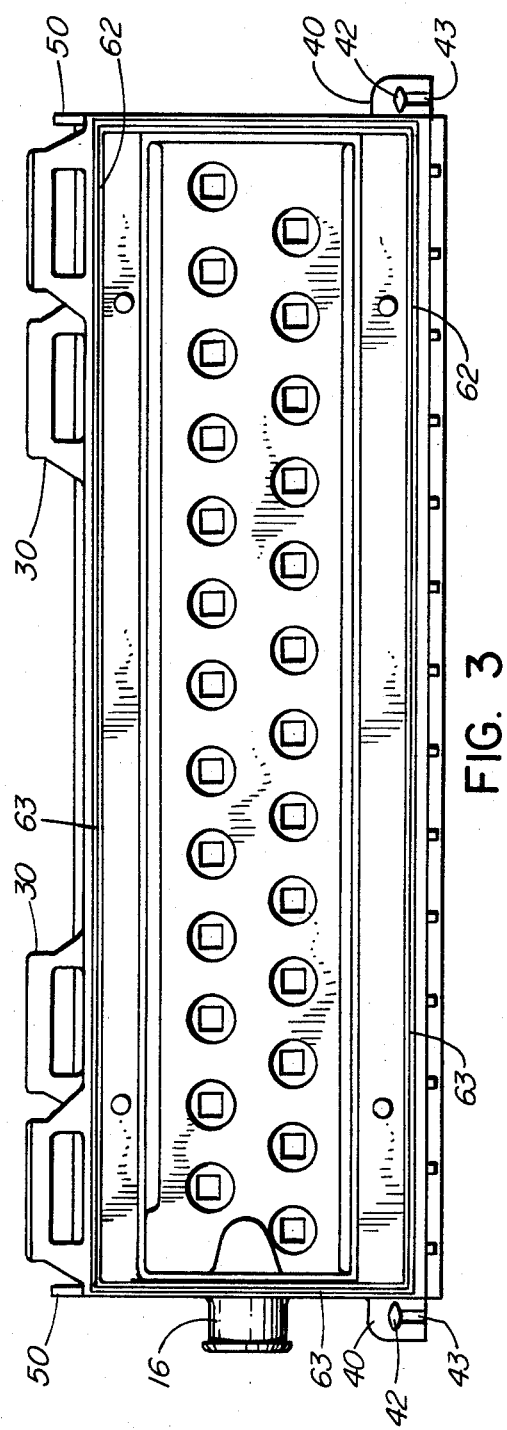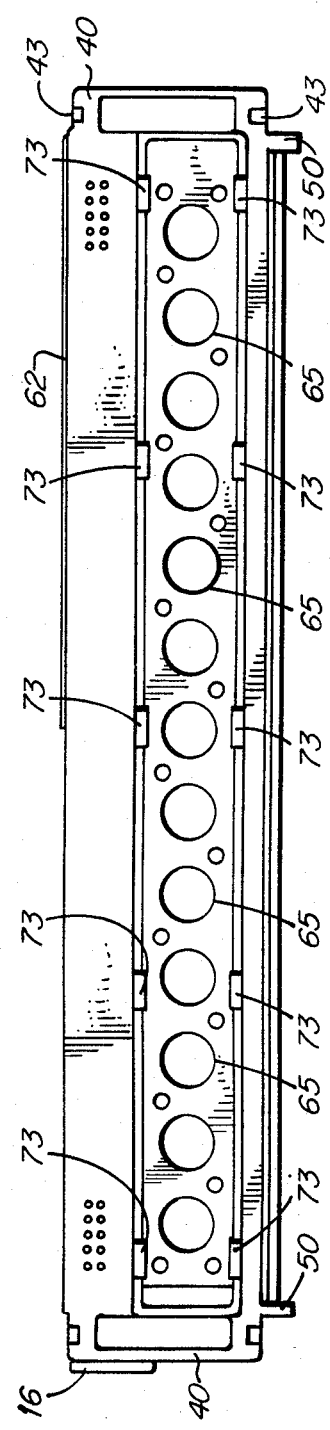

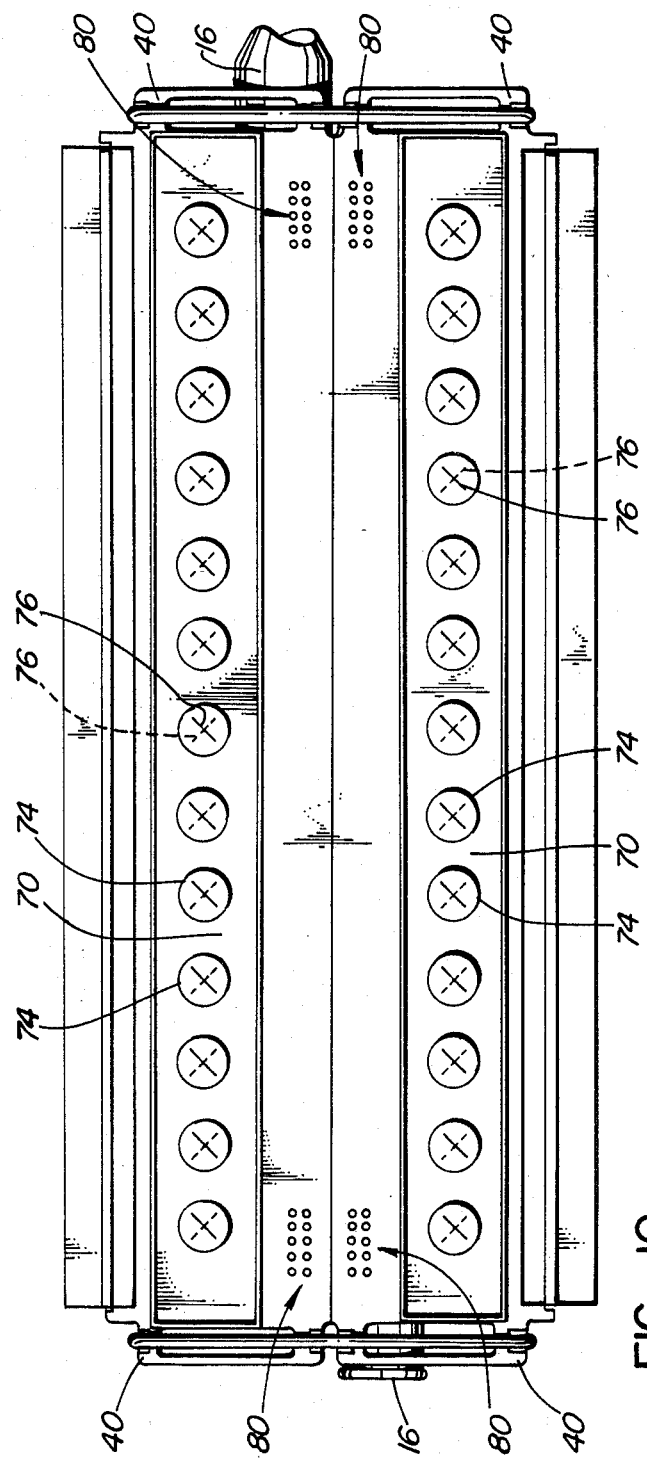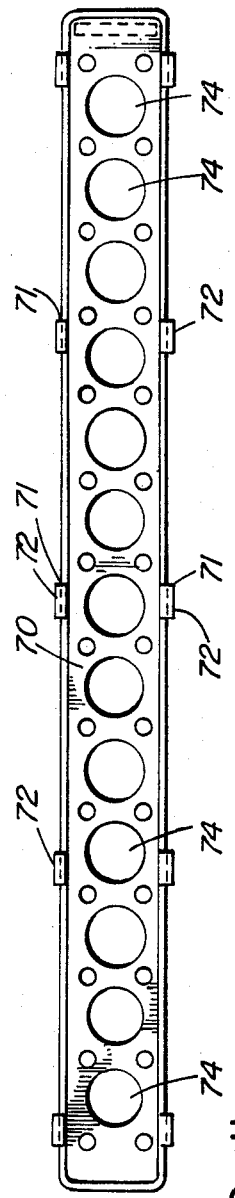
FIG. 10
FIG. 11

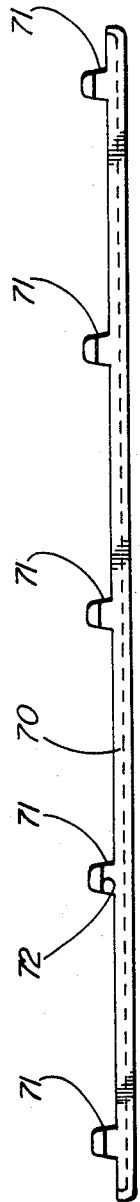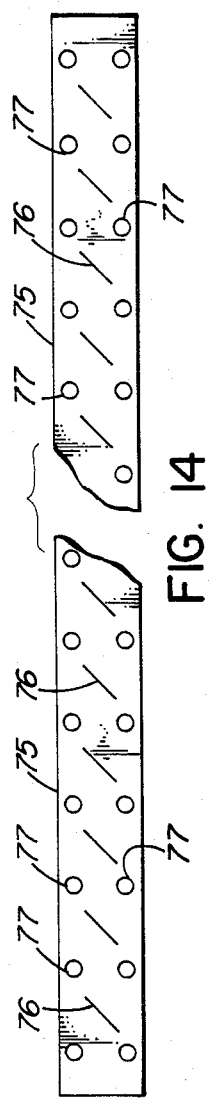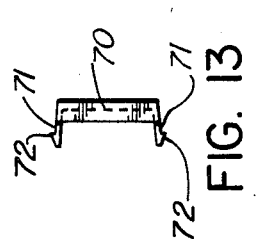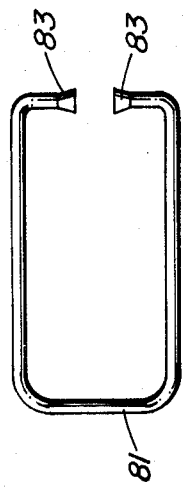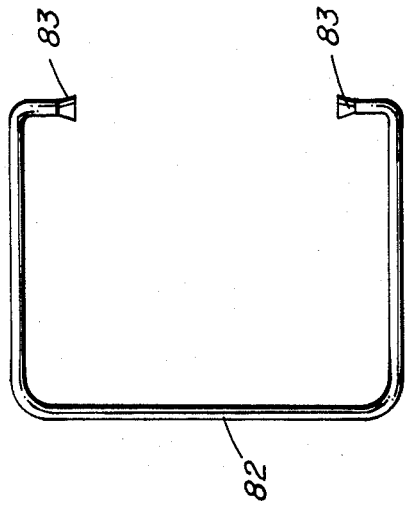

AERIAL CABLE TERMINAL

This invention relates to aerial cable terminals and is particularly concerned with terminals for connecting local distribution conductors to a main cable, as in a telecommunications system.

To connect local distribution conductors to a cable, a stub cable is first connected at one end to the main cable. Such a stub cable may have twelve or twenty-five conductor pairs for example. The stub cable conductors are connected at the one end to conductors in the cable and the connection closed and sealed. The other end of the stub cable is connected to a cable terminal. The terminal is usually suspended from the main cable and normally is supplied with the stub cable already connected, the conductors of the stub cable being connected to back ends of screw terminals in the terminal. Drop wires, for the local distribution, are connected to front ends of the screw terminals.

The present invention provides an aerial terminal which can be used as a single unit, or as a double unit with two terminals back-to-back. Alternate hanging members are provided for single and double unit use. Novel drop-wire retainers can be provided and also a novel snap-in closure or grommet structure is provided for the drop wire entry ports. A hinged cover with snap closure and various other features can also be provided.

In the broadest context, the present invention provides an aerial terminal which can be used as a single unit or can be assembled back-to-back with another terminal to give a double unit. Integral cable support hangers provide for alternate mounting as a single or double unit. Integral drop-wire retainer mounting means accept single or double unit drop-wire retainers.

These and other features of a terminal will be readily understood by the following description of certain embodiments, by way of example, in conjunction with the accompanying drawings, in which:

FIG. 1 is a front view of a terminal with screw terminals omitted;

FIG. 2 is a top plan view of a terminal;

FIG. 3 is a back view of a terminal with screw terminals omitted;

FIG. 4 is a bottom view of a terminal;

FIG. 10 is a bottom view of the two terminals in FIG. 9;

FIGS. 11, 12 and 13 are top plan view, side view and end view respectively of a seal retainer;

FIG. 14 is a plan view of a grommet or seal;

FIGS. 15 and 16 are plan views of alternate forms of drop-wire retainer rings.

Figure 5:
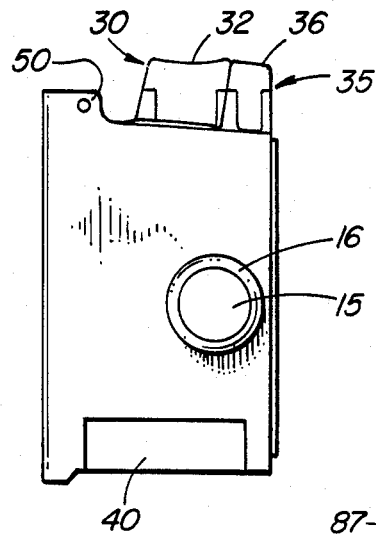
FIG. 5 is an end view in the direction of arrow A in FIG. 1.
Figure 6:
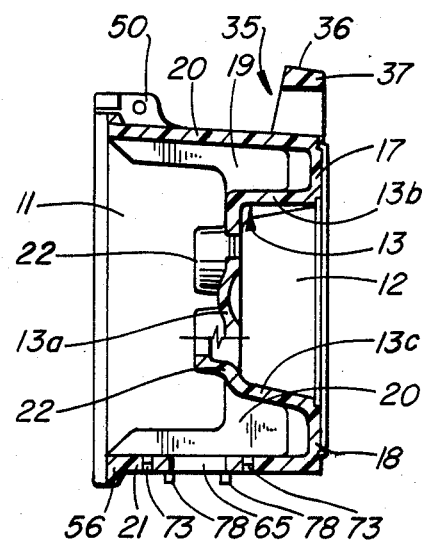
FIG. 6 is a cross-section on the line VI—VI of FIG. 1.

A cable terminal, as illustrated in FIGS. 1 to 7, comprises a housing 10 divided into front and back compartments 11 and 12 by a wall 13 (FIG. 6). In one end wall 14, an aperture 15 provides communication with the back compartment 12. A tubular extension 16 projects from the wall 14 around aperture 15.

Figure 7:
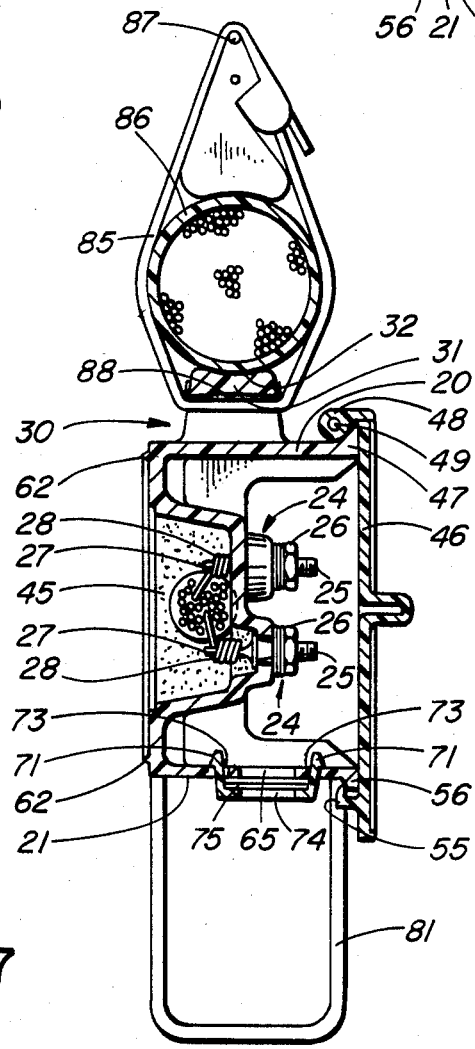
FIG. 7 is a cross-section similar to that of FIG. 6 but with screw terminals installed, a stub cable connected and the back of the terminal filled with potting compound.

The wall 13 does not extend the full height of the housing 10, but is somewhat U-shaped, extending forward from short sections of a back wall 17 and 18. Ribs 19 extend between the wall 13 and the top and bottom walls 20 and 21. The wall 13 has a central portion 13a which is parallel to the front and back surfaces of the housing, with two portions 13b and 13c joining the portion 13a to the back wall sections 17 and 18. In the central portion 13a are formed a plurality of hollow bosses 22, extending forward into the front compartment 11. In the example there are two rows of bosses 22, thirteen in a row, and the bosses in one row are staggered relative to the bosses in the other row. Each boss has a rectangular aperture 23 in its top surface. Screw terminals are positioned in the apertures 23, as seen in FIG. 7, the terminals indicated at 24. The terminals 24 have rectangular cross-section shank portions which fit in the apertures 23, and have threaded front portions 25 onto which conductors can be connected by nuts 26. At the rear, each terminal has a projection 27, to which cable stub conductors 28 can be connected, as by wire wrapping.

On the top wall 20 are provided support hangers by which the terminal can be hung from a cable. There are two forms of support hanger. A first pair of hangers, indicated at 30, extend up from the top wall at a position intermediate the front and back surfaces of the housing. The hangers are of an inverted U-shape with a flat bar portion 31 which has a shallow Vee formation on its top surface 32, as seen in FIGS. 5 and 7. The hangers 30 are spaced apart towards each end of the housing.

A further pair of hangers 35 also extend up from the top wall. These hangers are flush at one side with the back surface of the housing. This is seen in FIG. 6. In the example, hangers 35 are half the width of the hangers 30 and the outer surface 36 of flat bar portion 37 inclines downwardly towards the rear surface of the housing. Each hanger 35 is essentially half of a hanger 30. The use and reasons for hangers 35 will be described later. The relative positions of the hangers 30 and hangers 35 can be varied.

Molded integrally with the housing 10 are brackets 40, at each end at the lower edge of each end wall. These brackets are for the attachment of drop-wire retaining rings. One bracket, in FIG. 1, is shown sectioned. Each bracket has an arcuate outer wall 41 with closed ends, to form an enclosed channel open at the bottom. In each end wall there is an elongate slot 42. On the outer surface of each end wall is a downwardly extending groove 43, extending from the slot 42. Two alternate forms of retaining rings are described later. The rings have formed ends which permit of passage of the ends through the slots 42 in one orientation only. Normally the rings are attached when projecting sideways and then swing down, to clip into the grooves 43.

The terminals are normally supplied with a cable stub already connected. The stub enters the terminal via the aperture 15, and the conductors 28 in FIG. 7 are connected to the screw terminals 24. After connection of the conductors, the back compartment 12 is filled with potting compound, indicated at 45 in FIG. 7. The cable stub is sealed at the aperture 15.

To close the front compartment 11, a hinged cover 46 is provided. This is seen in FIG. 7. The cover is hinged at the top at a position spaced back a short distance from the front surface of the housing. A raised rim 47 extends along the top edge of the housing at the front and the cover 46 has a circular cross-section rib 48 which forms a hinge member. The cover is mounted on pins 49 which fit into brackets 50 and the rib 48 is in contact with the rim 47. There is frictional engagement between pins 49 and brackets 50 which maintains the cover at any desired open position. Contact between rib 48 and rim 47 assists in maintaining a seal to prevent entry of water into the terminal. At the bottom edge of the cover is a snap-action hooked member 55 which snaps over a rib 56 on the front edge of the bottom wall of the housing. The member 55 may extend for only part of the length of the cover, or for the whole length. The cover is manufactured with a slight amount of curvature, bowing outwardly along its length. When closed by engagement of the member 55 over rib 56, the cover is then constrained to a flat, or unbowed, configuration. This ensures a tight seal at each end, and avoids the possibility of gaps at the ends.

As stated, two terminals can be used together to form a double unit. As described, there are twenty-six screw terminals, in a terminal. This provides for a twelve-pair cable stub, with one spare pair of terminals. When two terminals are used together this will give positions for twenty-six pairs of screw terminals. A conventional stub cable size is twenty-five pair so that all of the screw terminal positions are used in one terminal and twelve pair of positions in the other. This avoids the need to provide different forms of terminal for single and double unit form.

Figure 8:
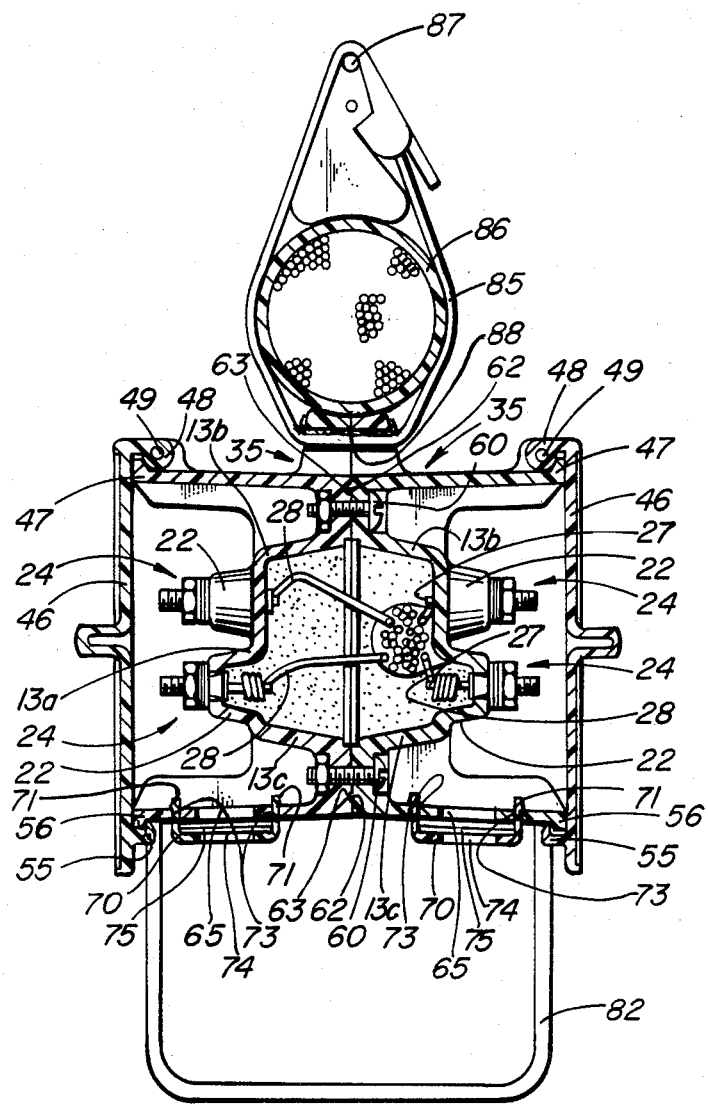
FIG. 8 is a cross-section through two terminals as in FIG. 7, back-to-back.
Figure 9:
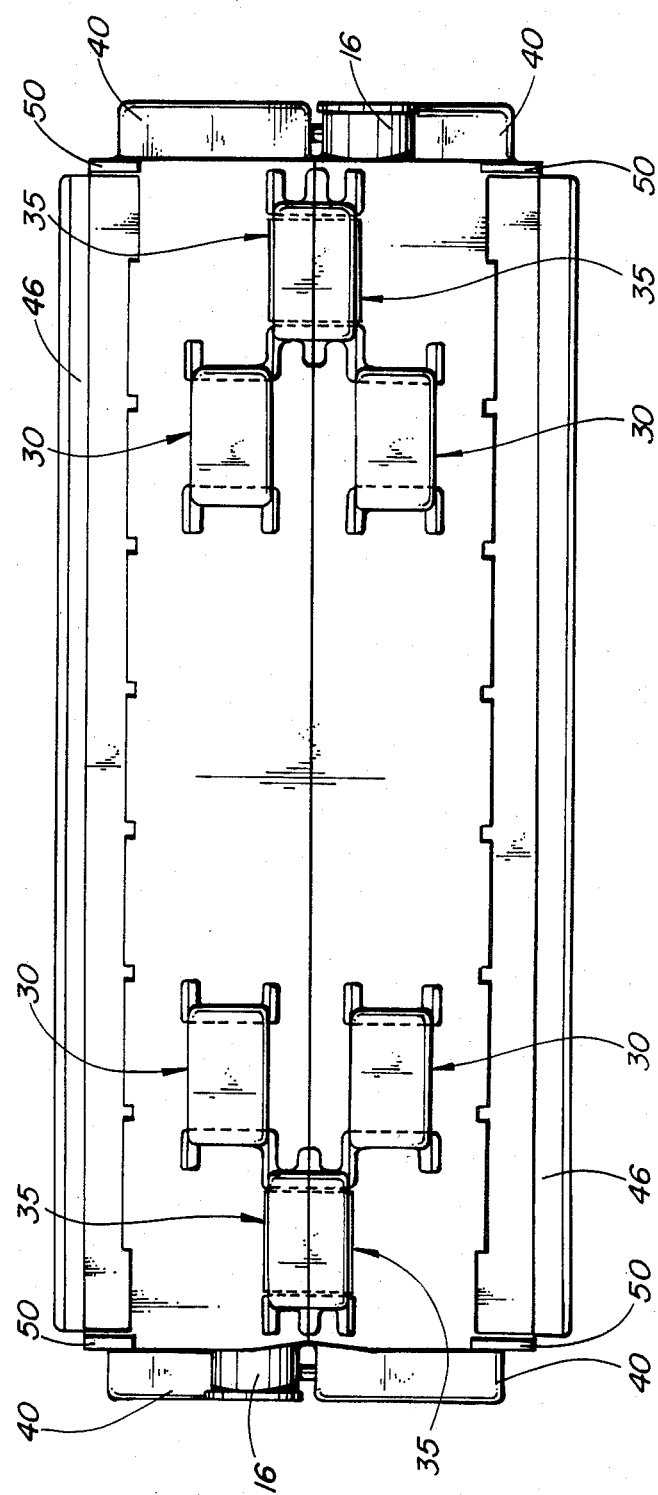
FIG. 9 is a top plan view of two terminals assembled back-to-back.

In double unit form the terminals are connected back-to-back. Normally the stub cable enters through the aperture 15 in one terminal. The aperture 15 in the second terminal is at the other end and is used to insert potting compound. The conductors are connected to the screw terminals in the two terminals and then the terminals are assembled back-to-back. This is obtained by screws 60 which pass through holes in the upper sections 17 of the back walls. The holes are not normally open, being partially formed but having sections which can be drilled out or otherwise removed. The arrangement of two terminals assembled back-to-back is seen in FIG. 8. Common references are used with FIGS. 6 and 8 as applicable. It will be seen that the thin hangers 35 are in alignment and form hangers the same thickness as hangers 30. A double unit is also illustrated in FIGS. 9 and 10. After the two terminals are assembled together, potting compound is injected to fill the two back compartments. This is illustrated in FIG. 8.

To provide a seal against outflow of potting compound between the two terminal housings, a peripheral seal is provided. This is obtained by forming a small rib for half the circumference and a matching groove for the other half. This also permits use of a single molding, that is the housing is hermaphroditic. The rib is indicated at 62 in FIGS. 2, 3, 4, 5, 6 and 7 and the groove 63 is indicated at 63 in FIG. 3. Rib and groove are seen in FIG. 8.

Entry into the front compartments 11, by the drop wires, is via apertures 65 in the bottom wall. It is desirable to seal these entries against ingress of foreign matter, for example dirt and insects. A snap-on seal grommet and retainer is provided. This is seen in position in FIG. 7, and also in position in each terminal in FIGS. 8 and 10. FIGS. 11, 12 and 13 illustrate the retainer and FIG. 14 illustrates the grommet.

The retainer 70 is a flat member having a peripherally upstanding rim. At spaced positions along each side projections 71 extend upward from the rim. Each projection has an outwardly extending lip 72. In the bottom wall 21 of the housing for the terminal, small apertures 73 are formed and positioned so that the projections 71 can pass up through them. Apertures 74 in the retainer 70 are aligned with the apertures 65 in the bottom wall. The projections are deflected inward slightly as they pass up through the apertures 73 and then snap outward for the lips 72 to engage over the inner surface of the bottom wall 21.

The retainer 70 holds in position a grommet or sealing member 75. This is indicated diagrammatically in FIGS. 7 and 8 and is seen in more detail in FIG. 14. In one example, the member 75 is a length of elastomeric material approximately twice the length of the retainer within the rim. A series of inclined slits 76 are made in the member at the same pitch as the apertures 65 and 74. Small holes 77 fit over small projections 78 on the bottom surface of the bottom wall 21. The member 75 is assembled to the bottom wall by positioning one half of the length of the member on the wall 21 with slits aligned with apertures 65. The member is then folded over and the second half positioned on top of the first half. In so doing, a second plurality of slits are positioned over the first slits but in a direction having the reverse inclination. Generally, the slits are at 45° to the longitudinal axis of the member 75 and when finally in position the member 75 provides two slits at 90° to each other, aligned with each aperture 65. The retainer is then snapped into position. This is seen in FIG. 10. Also seen in FIG. 10 are groups of small holes 80 at each end of the bottom wall which provide ventilation of the front compartment. Instead of being in one length, the sealing member can be in two pieces, one length being put in position and then the other length placed on top. It would still be arranged that the slits would have reverse inclinations.

Previously mentioned are drop-wire retaining rings, mounted in the brackets 40 at each end of the housing. These rings are in two sizes, one for a single terminal and one for a double terminal, and are seen at 81 and 82 in FIGS. 7 and 8 respectively.

FIG. 15 illustrates the ring 81 as in FIG. 7 while FIG. 16 illustrates the ring 82 as in FIG. 8. Both rings are of a generally U form having generally straight side members and bottom members. The ends of the sides are turned inward, towards each other and the ends are flattened at 83. The plane of the flattened portion is parallel to, and usually coincident with, the plane of the ring. As described in conjunction with FIG. 1, particularly the flattened ends 83 enter through elongate slots 42 in the brackets 40. The rings are held perpendicular to the adjacent end wall of the housing and the side members urged apart. The ends 83 are eased through the slots, the side members of the ring moving back towards their original spacing. On rotating the ring down, the side members snap into the grooves 43 on the brackets 40.

Terminals are usually supported, or suspended, from the main cable, and a support wire, by the hangers 30 or 35. In FIG. 7, ties 85 pass through the hangers 30, round the main cable 86 and over the support wire 87. In FIG. 8 the tie 85 passes through the two hangers 35 which are contiguous, and then round the cable 86 and support wire 87. The cable 86 is centered on the hangers 30 and 35 by the inclination of the top surfaces. The ties 85 are very firmly tightened, and a metal bracket or liner 88 is positioned in each hanger between the tie and the hanger. The metal liners 88 are inserted prior to insertion of the ties.

The majority of the terminal is in a cast synthetic resin material, with good corrosion and errosion properties and is also very tough. The number of parts is reduced to a minimum for economy in manufacture, the main housing being a unitary molding complete with terminal mounting structure. The stub cable is normally installed and the back compartment, or compartments in a double unit, filled with potting compound. In the field the installer connects the stub cable free end to a connector on the main cable—this is normally a permanently sealed splice. The terminal is then supported from the main cable and drop wires installed as necessary. It is quite often that all the drop wires are not installed at the same time. Drop wires are installed as the need for additional local service arises and therefore access to the front compartment or compartments, occurs from time to time. However, the terminal is well sealed by the cover when it is closed. Drop wires are installed by insertion up through apertures 74 and 65, through slits 76 in the seal member 75. The conductors are then connected to two of the screw terminals 24. Normally one row of screw terminals is for TIP conductors and the other row for RING conductors.

While the terminal has been illustrated, and described, specifically for twelve pair cable stub application with a single terminal, and twenty-five pair stub with two terminals back-to-back, a terminal can be made of any desired length to accommodate different numbers of pairs. Thus, a terminal can be shorter or longer than the examples described, for example, twenty-five pairs on one side. Also, while these terminals are usually hung from a support wire, by means of the hangers 30 and 35, it is also possible to mount terminals on poles and other structures, still using the hangers, by providing brackets or other members.

What is claimed is:

1. An aerial cable terminal, comprising:
   an elongate housing, the housing including top and bottom walls, end walls and a back wall, and a dividing wall extending between said top and bottom walls to divide the interior of the housing into a back compartment and a front compartment, said housing being of unitary molded structure;
   apertures in said dividing wall and a conductor terminal positioned in each aperture, each conductor terminal having a rear portion extending into said back compartment and a front portion extending into said front compartment;
   said rear portion of each conductor terminal adapted for connection of a stub cable conductor thereto;
   access means in one end wall for entry of a stub cable;
   an operable front cover closing the front of said front compartment; and
   support hangers extending up from an outer surface of said top wall, said support hangers comprising a first pair of hangers spaced apart along said top wall at positions intermediate the front and back walls and a second pair of hangers spaced apart along said top wall and having one side flush with the back surface of the housing, the hangers of said first pair displaced along the housing relative to the hangers of said second pair, said second pair of hangers positioned symmetrically on said housing to be contiguous with the second pair of hangers of a second terminal when two terminals are positioned back-to-back.

2. A terminal as claimed in claim 1, said dividing wall including a central portion extending parallel to the front and back surfaces of the housing and top and bottom portions extending from a top edge and a bottom edge, respectively, of said central portion, to said back wall.

3. A terminal as claimed in claim 2 including a plurality of hollow bosses on said central portion of said dividing wall, said bosses extending forward into said front compartment, said apertures formed in said bosses, an aperture in a top surface of each boss.

4. A terminal as claimed in claim 3, said apertures being rectangular, said terminals each including a shank portion having a cross-section conforming to and a tight fit in an aperture.

5. A terminal as claimed in claim 3, said bosses extending in two rows along said dividing wall.

6. A terminal as claimed in claim 5, the bosses in one row being offset, in a staggered relationship, relative to the bosses in the other row.

7. A terminal as claimed in claim 1, said access means in said one end wall comprising a tubular projection extending from an outer surface of said end wall, the bore of said extension extending through the end wall into said back compartment.

8. A terminal as claimed in claim 1, the hangers of said second pair being half the width of the hangers of said first pair.

9. A terminal as claimed in claim 8, each hanger being of inverted U shape and having a flat bar portion between two leg portions, each of said first pair of hangers having a shallow Vee formation on a top surface of said flat bar portion, when viewed in a direction along said housing, and each of said second pair of hangers having a top surface inclined slightly downwardly and rearwardly when viewed in a direction along said housing.

10. A terminal as claimed in claim 1, including a metal liner in each hanger.

11. A terminal as claimed in claim 1, including a drop wire support ring at each end.

12. A terminal as claimed in claim 11 including a bracket at a lower edge of each end wall, each bracket including an arcuate outer wall and end walls defining an enclosed channel open at the bottom, and an elongate slot in each end wall of the bracket, a groove in an outer surface of each end wall of the bracket extending downwardly from the slot, and said drop-wire support rings at each end having end portions extending through said slots and intermediate portions positioned to snap into said grooves when said support rings extend downwardly.

13. A terminal as claimed in claim 12, said elongate slots extending across said end walls of the brackets, and said end portions of said support rings including flattened portions oriented to pass through said slots when said support rings extend sideways from said housing.

14. A terminal as claimed in claim 1, including apertures in said bottom wall for access of drop-wire conductors to said front portions of said terminals.

15. A terminal as claimed in claim 14 including a seal attached to said bottom wall, over said apertures, said seal comprising two superposed lengths of elastomeric material each length including a series of inclined slits, a slit aligned with each aperture, the slits in one length having a reverse inclination to the slits in the other length.

16. A terminal as claimed in claim 15, including a retaining member attaching said seal to said bottom wall, said retaining member including deflectable projections extending through apertures in said bottom wall.

17. A terminal as claimed in claim 1, said front cover hingedly attached at a top edge to the housing and having a latch member at a bottom edge.

18. A terminal as claimed in claim 17, said front cover including a main flat portion and a rib extending along its top edge and spaced rearwardly from said main flat portion to define a narrow channel, pivot members at each end of said rib extending into brackets on said housing and a raised rim extending along the front edge of said top wall, said rim seating in said narrow channel when said cover is closed.

19. A terminal as claimed in claim 1, including a stub cable inserted through said access means in said one end, said stub cable including a plurality of conductors, a conductor connected to each of said rear portions of said terminals, and potting compound filling said back compartment.

20. A terminal as claimed in claim 1, including a second housing identical to said first-mentioned housing in back-to-back assembly with the first-mentioned housing a stub cable inserted through said access means in said one end of the first-mentioned housing, said stub cable including a plurality of conductors, a conductor connected to each of said rear portions of said terminals in both housings, and potting compound filling both of said back compartments.

* * * * *